United States Patent
Sohnke et al.

(10) Patent No.: US 12,257,477 B2
(45) Date of Patent: Mar. 25, 2025

(54) CONTROLLER TO DETERMINE SWIM CHARACTERISTICS OF A SWIMMER AND METHOD THEREOF

(71) Applicants: Robert Bosch GmbH, Stuttgart (DE); Robert Bosch Engineering and Business Solutions Private Limited, Bangalore (IN)

(72) Inventors: Thorsten Sohnke, Asperg (DE); Amithash Kankanallu Jagadish, London (GB); Kaustubh Ashok Gandhi, Stuttgart (DE); Sengottuvelan Senthilmurugan, Erode (IN); Pudur Marudhachalam Dheepak, Coimbatore (IN); Mohan Pooja, Trivandrum (IN); Tomar Mahima, Etah (IN)

(73) Assignees: Robert Bosch GmbH, Stuttgart (DE); Robert Bosch Engineering and Business Solutions, Bangalore (IN)

( * ) Notice: Subject to any disclaimer, the term of this patent is extended or adjusted under 35 U.S.C. 154(b) by 307 days.

(21) Appl. No.: 17/905,079

(22) PCT Filed: Feb. 8, 2021

(86) PCT No.: PCT/EP2021/052929
§ 371 (c)(1),
(2) Date: Aug. 26, 2022

(87) PCT Pub. No.: WO2021/170384
PCT Pub. Date: Sep. 2, 2021

(65) Prior Publication Data
US 2023/0142847 A1 May 11, 2023

(30) Foreign Application Priority Data
Feb. 27, 2020 (IN) .............................. 202041008427

(51) Int. Cl.
*A63B 24/00* (2006.01)
(52) U.S. Cl.
CPC ...... *A63B 24/0006* (2013.01); *A63B 2220/40* (2013.01); *A63B 2220/836* (2013.01); *A63B 2244/20* (2013.01)
(58) Field of Classification Search
CPC .......... A63B 24/0006; A63B 2220/836; A63B 2220/40; A63B 2244/20
See application file for complete search history.

(56) References Cited

U.S. PATENT DOCUMENTS 9,216,341 B2 * 12/2015 Li ........................ A63B 33/004
10,486,049 B2 * 11/2019 Nieminen .............. G06V 40/23
(Continued)

FOREIGN PATENT DOCUMENTS

GB          2511833 A  *  9/2014  ......... A61B 5/02438
JP       2018506369 A  *  3/2018

OTHER PUBLICATIONS

International Search Report corresponding to International Patent Application No. PCT/EP2021/052929, mailed May 20, 2021 (4 pages).

(Continued)

*Primary Examiner* — Octavia Hollington
(74) *Attorney, Agent, or Firm* — Maginot, Moore & Beck LLP

(57) ABSTRACT

The controller of a wearable device is used to determine swim characteristics of a swimmer. The controller is connected to at least one motion sensor selected from a group including a multi-axis gyroscope and a multi-axis accelerometer. The controller is adapted to detect input signals from the at least one motion sensor. The controller is further configured to perform dynamic stroke segmentations based on at least one of the input signals using a stroke segmen- (Continued)

tation module, extract feature vectors, using feature extraction module, from the at least one input signal based on the stroke segmentations, and determine the swim characteristics by using the feature vectors through a classifier module. The controller dynamically adapts to a style of the swimmer to detect the swim characteristics.

7 Claims, 3 Drawing Sheets

(56) References Cited

U.S. PATENT DOCUMENTS

| | | | |
|---|---|---|---|
| 2010/0210975 A1* | 8/2010 | Anthony, III | A61B 5/1123 600/595 |
| 2014/0278229 A1 | 9/2014 | Hong et al. | |
| 2016/0084869 A1 | 3/2016 | Yuen et al. | |
| 2018/0056123 A1* | 3/2018 | Narasimha Rao . | G09B 19/0038 |
| 2019/0209050 A1* | 7/2019 | Su | A63B 71/06 |
| 2019/0269968 A1* | 9/2019 | Eisenhardt | A63B 24/0003 |
| 2022/0341966 A1* | 10/2022 | Sujith | A61B 5/7264 |
| 2023/0321488 A1* | 10/2023 | Mahima | A61B 5/1123 700/91 |

OTHER PUBLICATIONS

Wang, J. et al., "SwimSense: Monitoring Swimming Motion Using Body Sensor Networks," ICIAP: International Conference on Image Analysis and Processing, Sep. 2016, Lecture Notes in Computer Science (LNCS) 9846, op. 45-55, Springer International Publishing AG, Berlin, Germany (11 pages).

Wang, Z. et al., "Swimming Motion Analysis and Posture Recognition Based on Wearable Inertial Sensors," IEEE International Conference on Systems, Man, and Cybernetics (SMC), Oct. 2019, pp. 3371-3376, IEEE (6 pages).

* cited by examiner

CONTROLLER TO DETERMINE SWIM CHARACTERISTICS OF A SWIMMER AND METHOD THEREOF

This application is a 35 U.S.C. § 371 National Stage Application of PCT/EP2021/052929, filed on Feb. 8, 2021, which claims the benefit of priority to Serial No. IN 2020 4100 8427, filed on Feb. 27, 2020 in India, the disclosures of which are incorporated herein by reference in their entirety.

The disclosure relates to a controller for a wearable device to determine swim characteristics of a swimmer and a method thereof.

BACKGROUND

In existing swim tracking solutions, the swim classifier module uses timing information in feature vector and uses time-pattern matching algorithms. The time-domain pattern matching algorithm may not be working for swimmers with varying skill levels (from amateur to professionals). Thus there is a need to develop single swim classifier solution which works for swimmers of all kind.

According to a prior art US2014278229, a use of gyroscopes in personal fitness tracking devices is disclosed. Biometric monitoring devices, including various technologies that may be implemented in such devices, are discussed herein. Additionally, techniques for utilizing gyroscopes in biometric monitoring devices are provided. Such techniques may, in some implementations, involve obtaining swimming metrics regarding stroke cycle count, lap count, and stroke type. Such techniques may also, in some implementations, involve obtaining performance metrics for bicycling activities.

SUMMARY

A wearable device includes at least one motion sensor and a controller. The at least one motion sensor includes a multi-axis gyroscope or a multi-axis accelerometer. The controller is operably connected to the at least one motion sensor and is configured to determine swim characteristics of a swimmer. The controller is configured to (i) detect input signals from the at least one motion sensor, (ii) perform stroke segmentations based on at least one of the detected input signals using a stroke segmentation module, (iii) extract feature vectors through a feature extraction module from the detected input signals based on the stroke segmentations, and (iv) determine the swim characteristics using the extracted feature vectors through a classifier module.

BRIEF DESCRIPTION OF THE DRAWINGS

An embodiment of the disclosure is described with reference to the following accompanying drawings.

DETAILED DESCRIPTION

Figure 1:
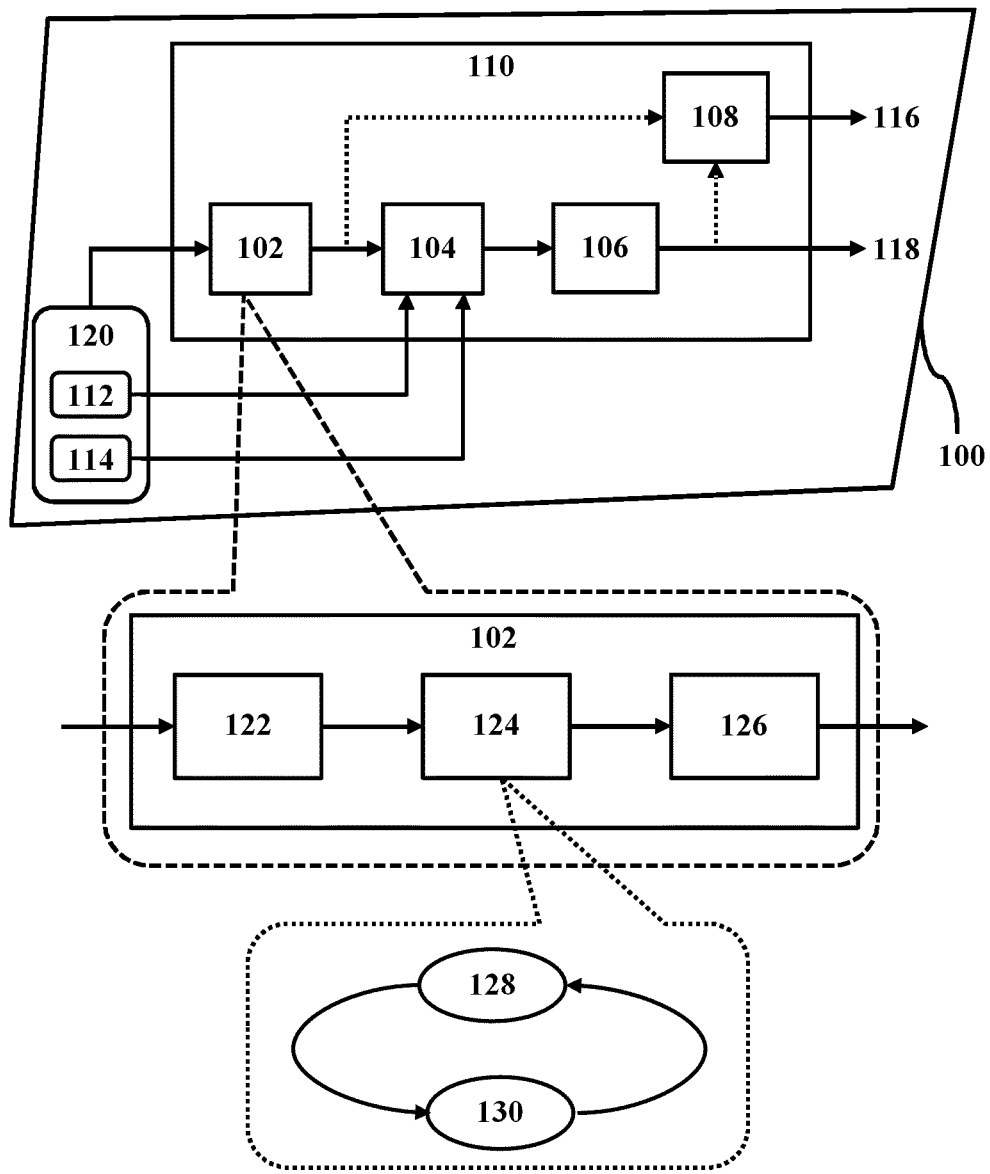
FIG. 1 illustrates a block diagram a controller for a wearable device, according to an embodiment of the disclosure.

FIG. 1 illustrates a block diagram a controller for a wearable device, according to an embodiment of the disclosure. The controller 110 of the wearable device 100 is used to determine swim characteristics of a swimmer. The controller 110 connected to at least one motion sensor 120 selected from a group comprising a multi-axis gyroscope 112 and a multi-axis accelerometer 114. The controller 110 adapted to, detect input signals 202 (shown in FIG. 2) from the at least one motion sensor 120, characterized by, the controller 110 further adapted to perform stroke segmentations based on at least one of the input signals 202 using a stroke segmentation module 102, extract feature vectors, using feature extraction module 104, from the at least one input signal 202 based on the stroke segmentations, and determine the swim characteristics by using the feature vectors through a classifier module 106.

In an embodiment, the controller 110 comprises following modules. The stroke segmentation module 102 detects strokes from the continuous stream of the input signals 202 from the at least one motion sensor 120, and segments each stroke.

The feature extraction module 104 extracts statistical features from the segmented stroke for classification. The features extracted from a current stroke segment and a previous stroke segment classifier are used to classify the swim stroke type by the classifier module 106. A stroke counter 108 is also used to counts/increments the swim strokes when a flag is set by the stroke segmentation module 102. If the stroke segment corresponds to a turn (as detected from the classifier module 106), the counter is not incremented.

The controller 110 is an electronic control unit to process signals received from sensors. The controller 110 comprises memory elements such as Random Access Memory (RAM), Read Only Memory (ROM), Analog-to-Digital Converter (ADC) and vice-versa DAC, clocks, timers and a processor connected with the components through bus channels. The aforementioned modules are logics or instructions which are stored in the memory elements and accessed by the processor as per the defined routines. The internal components of the controller 110 is not used or explained for being state of the art, and the same must not be understood in a limiting manner.

The wearable device 100 is any one selected from but not limited to a smart watch, a smart band, a smart ring and the like.

A stream of the input signals 202 from the gyroscope 112 and the accelerometer 114 have to be segmented for feature extraction. The conventional swim stroke segmentation with fixed time window length is not accurate, as the swim stroke durations depends on the experience, skill and type of swim styles employed by the swimmer. Therefore, to dynamically adapt the type of swimmer, the stroke segmentation module 102 is provided. The main sub-modules of stroke segmentation modules 102 are a filter module 122, a dynamic segmentation module 124 and optionally a validation module 126. The filter module 122 converts the raw input signals 202 into a smooth noiseless signal. The dynamic segmentation module 124 generates an envelope signal 206 using state machine conditions/principle. The validation module 126 validates/confirms the detection segments.

Figure 2:
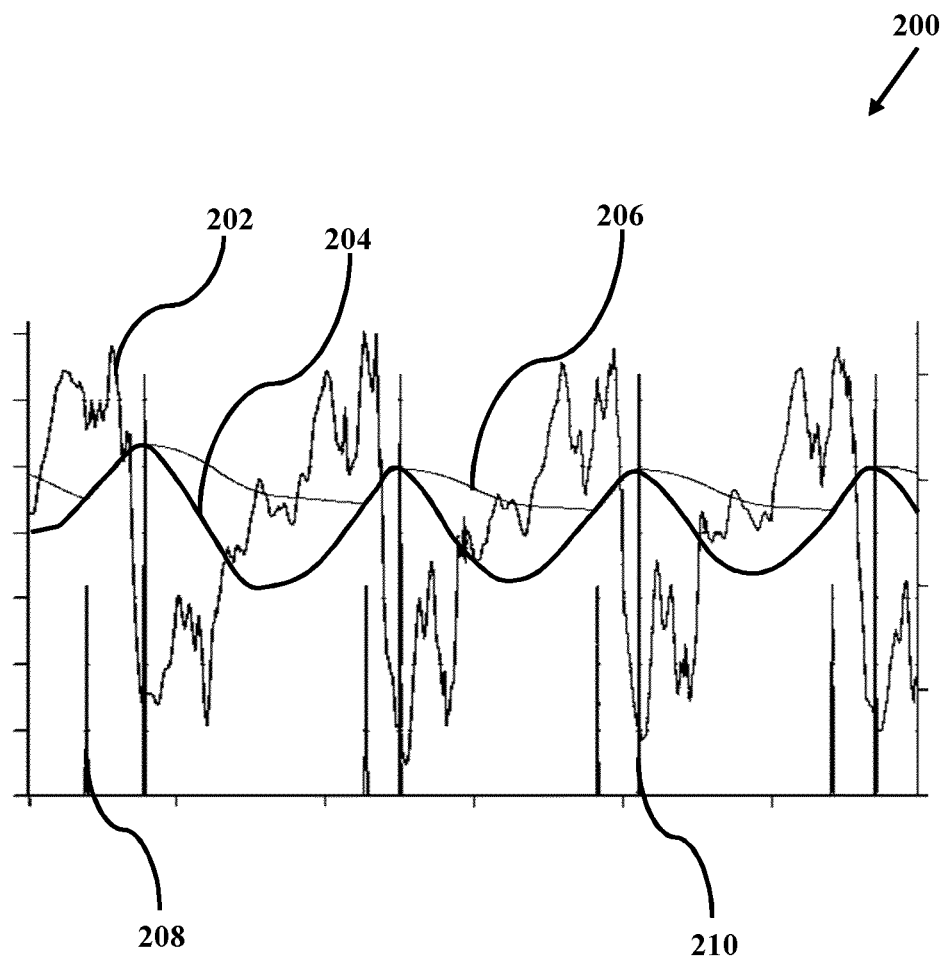
FIG. 2 illustrates a sample waveforms processed by the controller, according to an embodiment of the disclosure.

FIG. 2 illustrates a sample waveforms processed by the controller, according to an embodiment of the disclosure. A graph 200 is shown, where the X-axis denotes time in suitable units and Y-axis denotes voltage in suitable units. The raw signals or the at least one input signal 202 received from the at least one motion sensor 120 varies drastically. An approximated sinusoidal waveform is obtained from the input signal 202, which is termed as the filtered signal 204.

An envelope signal 206 is obtained from the filtered signal 204 based on state machine conditions. The aforementioned signals is now explained in the below sections.

A working of the stroke segmentation module 102 is explained. The controller 110 is adapted to process at least one dominant axis signal from the detected input signals 202 through a filter module 122. The dominant axis signal is selected automatically based on comparison of the other signals. Alternatively, the dominant axis signal of either the gyroscope 112 or the accelerometer 114 is detected and smoothened using the filter module 122 whose coefficients are determined empirically using the swim data logs. An example of the filter module 122, but not limited to the same is Infinite-Impulse Response (IIR). The filter module 122 removes fast-varying component of the at least one input signal 202 (i.e. the dominant axis signal) and outputs only slowly-varying component. In simple words, the filter module 122 processes dominant axis signal received from at least one motion sensor 120 and outputs the filtered signal 204. The filtered signal 204 is then processed by the dynamic segmentation module 124, which generates the envelope signal 206 from the filtered signal 204 based on state machine conditions.

The generation of the envelope signal 206 is now explained. The envelope signal 206 follows the filtered signal 204 by default, i.e. at start, the envelope signal 206, which is initiated by the controller 110, follows the filtered signal 204 and the state is set to follow. If value of the filtered signal 204 is decreasing, the envelope signal 206 is made to fall at a predefined rate, and the state is changed to fall. The fall phase in the envelope signal 206 is referenced as a fall state 128 and is done at a predetermined rate. As per the state machine condition, the state stays in fall state 128 as long as the filtered signal 204 is below the envelope signal 206. Once the filtered signal 204 crosses above the envelope signal 206 in the fall state 128, the envelope signal 206 is made to follow the filtered signal 204 and state changes to follow. In other words, if value of the filtered signal 204 increases and exceeds a value of the envelope signal 206 in the fall state 128, the envelope signal 206 starts following the filtered signal 204. The follow phase of the envelope signal 206 is referenced as follow state 130. The controller 110 detects a stroke segment based on occurrence of any one of two follow states 130 and fall states 128. The time instant at which the state transition happens are captured to validate segmentation. The state transitions are denoted by 208 and 210, are used by the validation module 126 to validate the detected segments.

From the stroke segmentation module 102, whenever the flag is true, a plurality of statistical features are extracted using raw samples from the previously detected stroke instant to the currently detected stroke instant. The features are calculated on the input signals 202 of the three-axis gyroscope 112 and the three-axis accelerometer 114. The feature vectors are extracted between end of a previous stroke instant and beginning of a current stroke instant. The feature vectors are selected from a group comprising a minimum of accelerometer 114 in Z-axis, minimum value of a gyroscope 112 in X-axis, a maximum value of gyroscope 112 in Z-axis, a mean of accelerometer values in X-axis, a mean of accelerometer values in Y-axis, a mean of gyroscope 112 values in X-axis, a mean of gyroscope values in Y-axis, a standard deviation of accelerometer values in X-axis, a standard deviation of gyroscope values in X-axis, a Root Mean Square (RMS) of gyroscope values in X-axis, a Simple Moving Average (SMA) of accelerometer values along X-axis, Y-axis and Z-axis, and a SMA of gyroscope values along X-axis, Y-axis and Z-axis.

The swim characteristics comprises a stroke type 118 and a stroke count 116. The stroke type 118 is determined by the classifier module 106 based on feature vectors of a previous stroke and a current stroke. The stroke count 116 is determined based on the detected stroke segment and the stroke type 118. Similar to the feature extraction module 104, the swim classifier module 106 is invoked by the controller 110, whenever the flag of the stroke segmentation module 102 is true. The feature vectors at the current stroke and the previous strokes are stacked together and passed to swim classifier module 106. The swim classifier module 106 is a Machine Learning (ML) model which is already trained using similar stacked features vector and training label. In one example, a Random Forest (RF) is used as the classifier module 106 as classification of swim style into freestyle, butterfly, breaststroke and backstroke, Turn and Unknown. The ML model is also trained with label 'Unknown' to handle scenarios such as resting/pause between laps and jumps. The RF model is used as an example, and the same must not be understood in limiting manner.

Further, the flag from the stroke segmentation module 102 and a flag for the determined stroke type/style 118 from the classifier module 106 are fused together, by the stroke counter 108 to update stroke count 116. The flag from the stroke segmentation module 102 is set true even for turn events. However, the turn events should not be counted as a stroke count 116. Thus, the stroke count 116 is incremented only if the flag from the stroke segmentation module 102 is true and the stroke type 118 is any one of the freestyle, butterfly, breaststroke and backstroke.

According to an embodiment of the disclosure, the controller 110 for the wearable device 100 is provided for dynamic segmentation of swim strokes. The controller 110 is connected to at least one motion sensor 120 selected from a group comprising the multi-axis gyroscope 112 and the multi-axis accelerometer 114. The controller 110 is characterized by, adapted to process at least one dominant axis signal from the detected input signals 202 of the at least one motion sensor 120 through the filter module 122. A filtered signal 204 is obtained as an output through the filter module 122. The controller 110 generates the envelope signal 206 from the filtered signal 204 based on the state machine conditions, comprising, if value of the filtered signal 204 is decreasing, then the envelope signal 206 decreases at a predefined rate, referenced as the fall state 128. If value of the filtered signal 204 is increasing and exceeds a value of the envelope signal 206 in the fall state 128, then the envelope signal 206 follows the filtered signal 204, referenced as the follow state 130. The controller 110 then detects the stroke segment between occurrence of any one of two follow states 130 and fall states 128. The segmented strokes are then used in combination with other or aforementioned methods to determine the swim characteristics. The controller 110 explained in this paragraph is though similar to explanation in the previous paragraph, but here it is dedicated only for the stroke segmentation alone.

Figure 3:
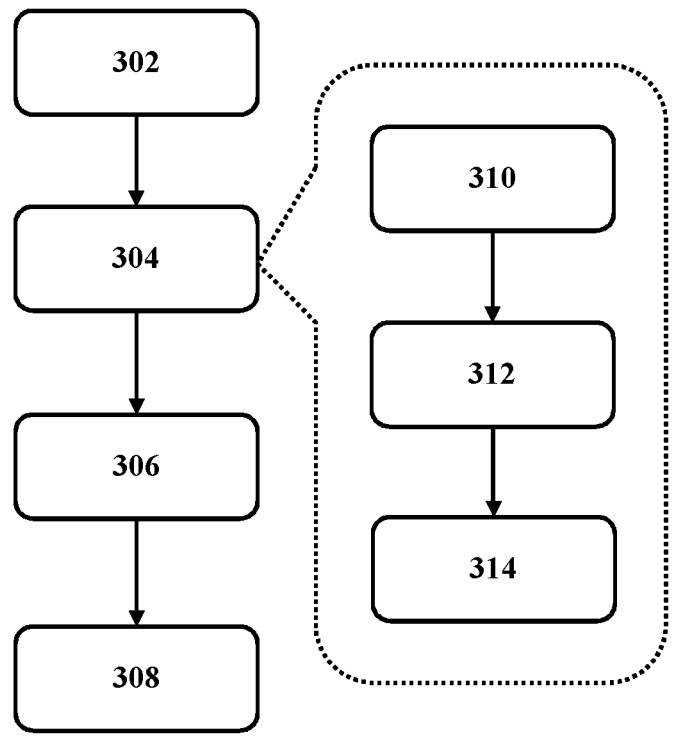
FIG. 3 illustrates a method for determining swim characteristics, according to the disclosure.

FIG. 3 illustrates a method for determining swim characteristics, according to the disclosure. The method of determining swim characteristics of the swimmer through the wearable device 100 comprises the steps of, a step 302 comprises receiving input signals 202 from at least one motion sensor 120 selected from the multi-axis gyroscope 112 and the multi-axis accelerometer 114. The method is characterized by a step 304 comprising dynamically segmenting strokes based on at least one of the input signals 202 of the at least one motion sensor 120. A step 306 comprises extracting feature vectors from the input signals 202 based on the stroke segments. A step 308 comprises determining the swim characteristics by using the feature vectors through the classifier module 106.

The step 304 of dynamic segmentation further comprises multiple steps described as below. A step 310 comprises processing at least one dominant axis signal from the detected input signals 202 through the filter module 122 and output the filtered signal 204. A step 312 comprises generating the envelope signal 206 from the filtered signal 204 based on the state machine conditions, comprising, following the filtered signal 204 by default, then falling at a predefined rate if value of the filtered signal 204 is decreasing. The state of falling is referenced as the fall state 128. Lastly, following the filtered signal 204 if value of the filtered signal 204 exceeds the value of the envelope signal 206 in the fall state 128. The state of following is referenced as a follow state 130. A step 314 comprises detecting a stroke segment based on occurrence of any one of two follow states 130 and fall states 128.

The feature vectors are extracted from the previous stroke segment and the current stroke segment. The feature vectors are selected from a group comprising a minimum of accelerometer 114 in Z-axis, minimum value of a gyroscope 112 in X-axis, a maximum value of gyroscope 112 in Z-axis, a mean of accelerometer values in X-axis, a mean of accelerometer values in Y-axis, a mean of gyroscope values in X-axis, a mean of gyroscope values in Y-axis, a standard deviation of accelerometer values in X-axis, a standard deviation of gyroscope values in X-axis, a Root Mean Square (RMS) of gyroscope values in X-axis, a Simple Moving Average (SMA) of accelerometer values along X-axis, Y-axis and Z-axis, and a SMA of gyroscope values along X-axis, Y-axis and Z-axis.

The swim characteristics comprises the stroke type 118 and the stroke count 116. The stroke type 118 is determined by the classifier module 106 based on feature vectors of the previous stroke segment and the current stroke. The stroke count 116 is determined based on the detected stroke segment and the stroke type 118.

According to the disclosure, a method for dynamically segmenting swim strokes in the wearable device 100 is disclosed. The step 310 comprises processing at least one dominant axis signal from the detected input signals 202 through the filter module 122 and output the filtered signal 204. The step 312 comprises generating the envelope signal 206 from the filtered signal 204 based on the state machine conditions, comprising, following the filtered signal 204 by default, then falling at a predefined rate if value of the filtered signal 204 is decreasing. The state of falling is referenced as the fall state 128. Lastly, following the filtered signal 204 if value of the filtered signal 204 exceeds the value of the envelope signal 206 in the fall state 128. The state of following is referenced as a follow state 130. The step 314 comprises detecting a stroke segment based on occurrence of any one of two follow states 130 and fall states 128. The method of dynamic segmentation is usable along with other methods of determining stroke type 118 and stroke counts 116.

According to the disclosure, a controller 110 and method for swim stroke detection and stroke classification using at least one motion sensor 120 is provided. The at least one motion sensor 120 is selected from a gyroscope 112 and accelerometer 114. Alternatively, a single Inertial Measurement Unit (IMU) sensor is usable. The major swim types/styles 118 detected are but not limited to freestyle, breast stroke, back stroke and butterfly stroke. The controller 110 takes into consideration, a first and a second order statistics for swim classification. The present disclosure provides the controller 110 and method which dynamically adapts to the style of the swimmer to detect the swim characteristics, irrespective of whether the swimmer is a child, adolescent, adult, etc. Further, the present disclosure is independent of the arm length of the swimmers as well.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

We claim:
1. A wearable device comprising:
at least one motion sensor including a multi-axis gyroscope or a multi-axis accelerometer; and
a controller operably connected to the at least one motion sensor and configured to determine swim characteristics of a swimmer, the controller configured to:
  detect input signals from the at least one motion sensor,
  perform stroke segmentations based on at least one of the detected input signals using a stroke segmentation module,
  extract feature vectors through a feature extraction module from the detected input signals based on the stroke segmentations, and
  determine the swim characteristics using the extracted feature vectors through a classifier module,
wherein the stroke segmentation module is configured to:
  process at least one dominant axis signal from the detected input signals through a filter module and output a filtered signal;
  generate an envelope signal from the filtered signal based on state machine conditions by:
    following the filtered signal by default;
    falling at a predefined rate when a value of the filtered signal is decreasing, referenced as a fall state, and
    following the filtered signal when the value of the filtered signal increases and exceeds a value of the envelope signal in the fall state, referenced as a follow state, and
  detect a stroke segment based on an occurrence of any one of two of the follow states and the fall states.

2. The wearable device as claimed in claim 1, wherein:
the feature vectors are extracted from a previous stroke segment and a current stroke, and
the feature vectors are selected from a group consisting of a minimum of an accelerometer in a Z-axis, a minimum value of a gyroscope in an X-axis, a maximum value of the gyroscope in the Z-axis, a mean of accelerometer values in the X-axis, a mean of accelerometer values in a Y-axis, a mean of gyroscope values in the X-axis, a mean of gyroscope values in the Y-axis, a standard deviation of accelerometer values in the X-axis, a standard deviation of gyroscope values in the X-axis, a Root Mean Square (RMS) of gyroscope values in the X-axis, a Simple Moving Average (SMA) of accelerometer values along the X-axis, the Y-axis, and the Z-axis, and an SMA of gyroscope values along the X-axis, the Y-axis, and the Z-axis.

3. The wearable device as claimed in claim 1, wherein:
the swim characteristics comprise a stroke type and a stroke count, the stroke type is determined by the classifier module based on the feature vectors of a previous stroke and a current stroke, and the stroke count is determined by a stroke counter based on the detected stroke segment and the stroke type.

4. A controller for a wearable device for dynamic segmentation of swim strokes, the controller connected to at least one motion sensor selected from a group consisting of a multi-axis gyroscope and a multi-axis accelerometer, the controller configured to:

process at least one dominant axis signal from detected input signals of the at least one motion sensor through a filter module and output a filtered signal;

generate an envelope signal from the filtered signal based on state machine conditions, comprising:

when a value of the filtered signal is decreasing, then the envelope signal decreases at a predefined rate, referenced as a fall state, and when the value of the filtered signal is increasing and exceeds a value of the envelope signal in the fall state, then follow the filtered signal, referenced as a follow state; and detect a stroke segment between occurrence of any one of two follow states and fall states.

5. A method of determining swim characteristics of a swimmer using a wearable device, the method comprising:

receiving input signals from at least one motion sensor;

dynamically segmenting strokes based on at least one of the received input signals using a stroke segmentation module;

extracting feature vectors from the received input signals based on the stroke segments using a feature extraction module, and determining the swim characteristics using the extracted feature vectors through a classifier module, wherein the at least one motion sensor includes a multi-axis gyroscope or a multi-axis accelerometer, wherein dynamically segmenting the strokes comprises:

processing at least one dominant axis signal from the received input signals through a filter module and outputting a filtered signal;

generating an envelope signal from the filtered signal based on state machine conditions, the envelope signal generated by:

following the filtered signal by default;

falling at a predefined rate when a value of the filtered signal is decreasing, the state of falling is referenced as a fall state; and following the filtered signal when the value of the filtered signal exceeds a value of the envelope signal in the fall state, the state of following is referenced as a follow state; and detecting the stroke segment based on an occurrence of any one of two of the follow states and the fall states.

6. The method as claimed in claim 5, wherein:

the feature vectors are extracted from a previous stroke segment and a current stroke, and the feature vectors are selected from a group consisting of a minimum of an accelerometer in a Z-axis, a minimum value of a gyroscope in an X-axis, a maximum value of the gyroscope in the Z-axis, a mean of accelerometer values in the X-axis, a mean of accelerometer values in a Y-axis, a mean of gyroscope values in the X-axis, a mean of gyroscope values in the Y-axis, a standard deviation of accelerometer values in the X-axis, a standard deviation of gyroscope values in the X-axis, a Root Mean Square (RMS) of gyroscope values in the X-axis, a Simple Moving Average (SMA) of accelerometer values along the X-axis, the Y-axis, and the Z-axis, and a SMA of gyroscope values along the X-axis, the Y-axis, and the Z-axis.

7. The method as claimed in claim 6, wherein:

the swim characteristics comprises a stroke type and a stroke count, the stroke type is determined by the classifier module based on feature vectors of a previous stroke and a current stroke, and the stroke count is determined by a stroke counter based on the detected stroke segment and the stroke type.

* * * * *